(12) United States Patent
Dashefsky

(10) Patent No.: US 6,282,833 B1
(45) Date of Patent: Sep. 4, 2001

(54) INSECT REPELLING DEVICE

(76) Inventor: Daynin Dashefsky, 2080 Maluniu Ave., Kailua, HI (US) 96734

( * ) Notice: Subject to any disclaimer, the term of this patent is extended or adjusted under 35 U.S.C. 154(b) by 0 days.

(21) Appl. No.: 09/457,532

(22) Filed: Dec. 9, 1999

(51) Int. Cl.[7] ............................. A01M 1/20; A01M 5/00; A01M 7/00; A01M 17/00; A01M 13/00
(52) U.S. Cl. .............................................. 43/132.1; 43/125
(58) Field of Search .................................. 43/132.1, 125

(56) References Cited

U.S. PATENT DOCUMENTS

| | | |
|---|---|---|
| 2,788,762 | 4/1957 | Wright . |
| 3,292,319 | 12/1966 | McCarthy . |
| 3,796,002 | 3/1974 | Katsuda . |
| 3,799,105 | 3/1974 | Porter . |
| 4,074,653 | 2/1978 | Pember . |
| 5,003,721 * | 4/1991 | Underwood ........................ 43/132.1 |
| 5,657,574 | 8/1997 | Kandathil et al. . |
| 5,956,880 | 9/1999 | Sugimoto . |

* cited by examiner

*Primary Examiner*—Charles T. Jordan
*Assistant Examiner*—Nicholas W DiCostanzo
(74) *Attorney, Agent, or Firm*—Wood, Phillips, VanSanten, Clark & Mortimer

(57) ABSTRACT

A device for repelling insects from the vicinity of a support surface for the repelling device. The repelling device has a base which can be placed against an upwardly facing support surface to thereby maintain the repelling device in an operative position, a first arm connected to the base and in an elevated position above the upwardly facing surface on which the repelling device is maintained in the operative position and rotatable around a vertically extending axis, a first element depending from the first arm and rotatable with the first arm around the vertically extending axis, and a drive which is operable to rotate the first arm around the vertically extending axis to thereby cause the first element to trace an annular path around the vertically extending axis.

22 Claims, 5 Drawing Sheets

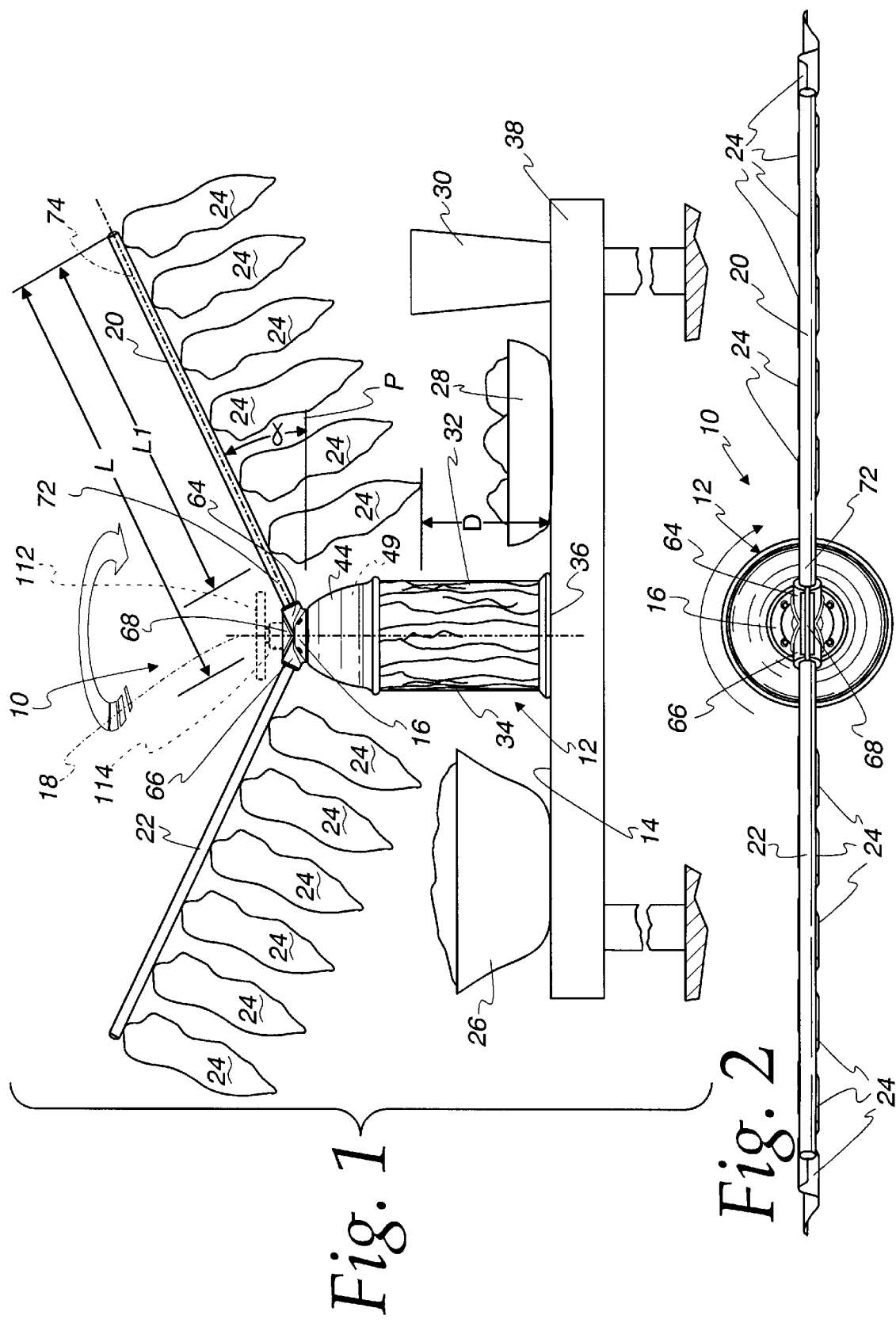

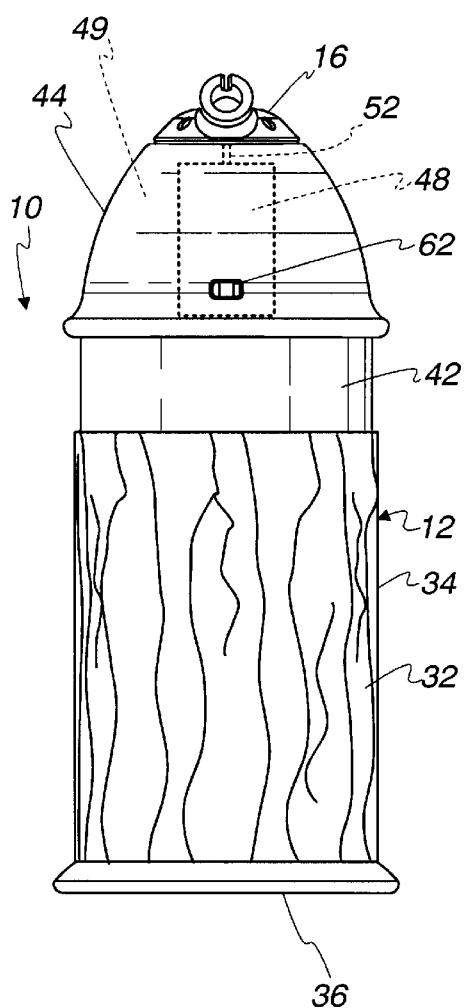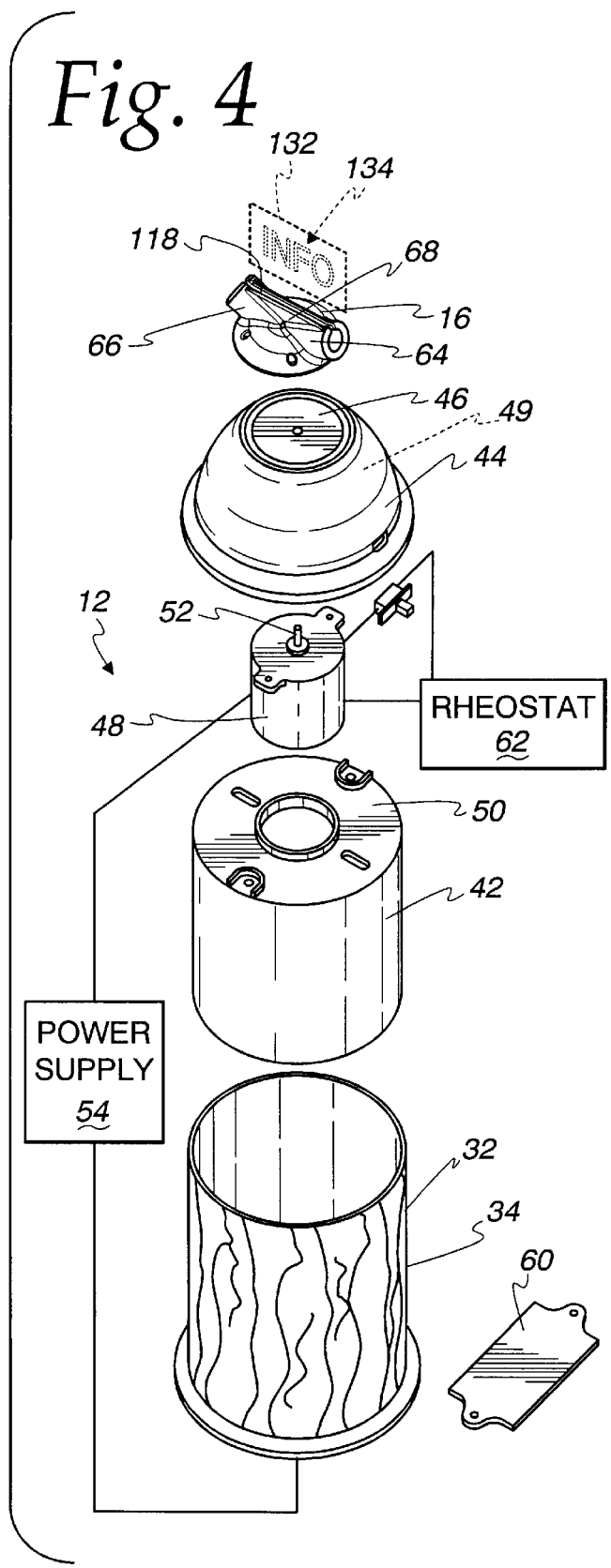

Fig. 8
Fig. 9
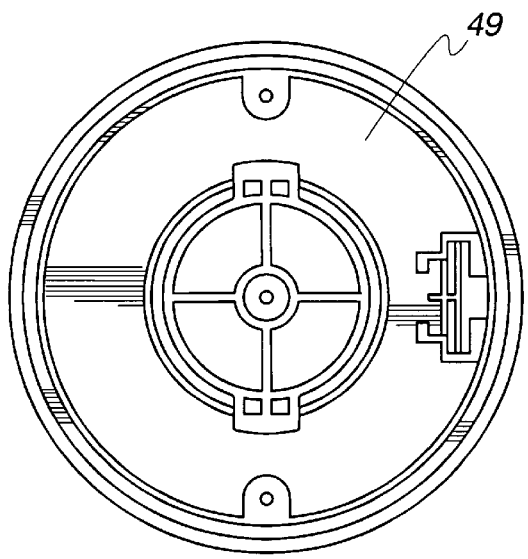
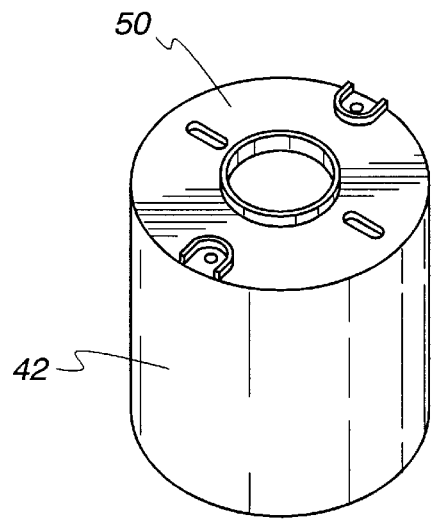
Fig. 10
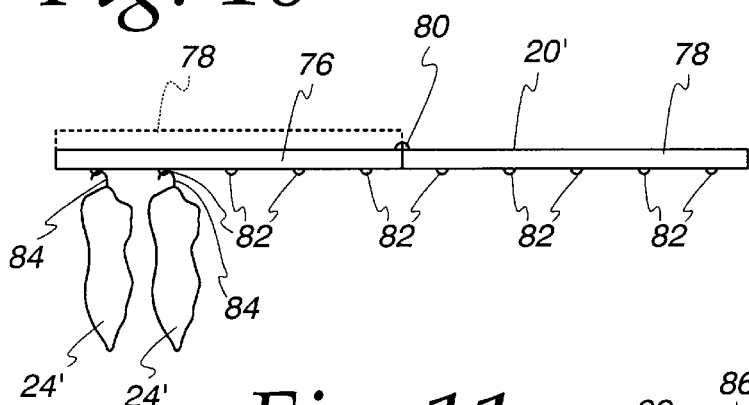
Fig. 11
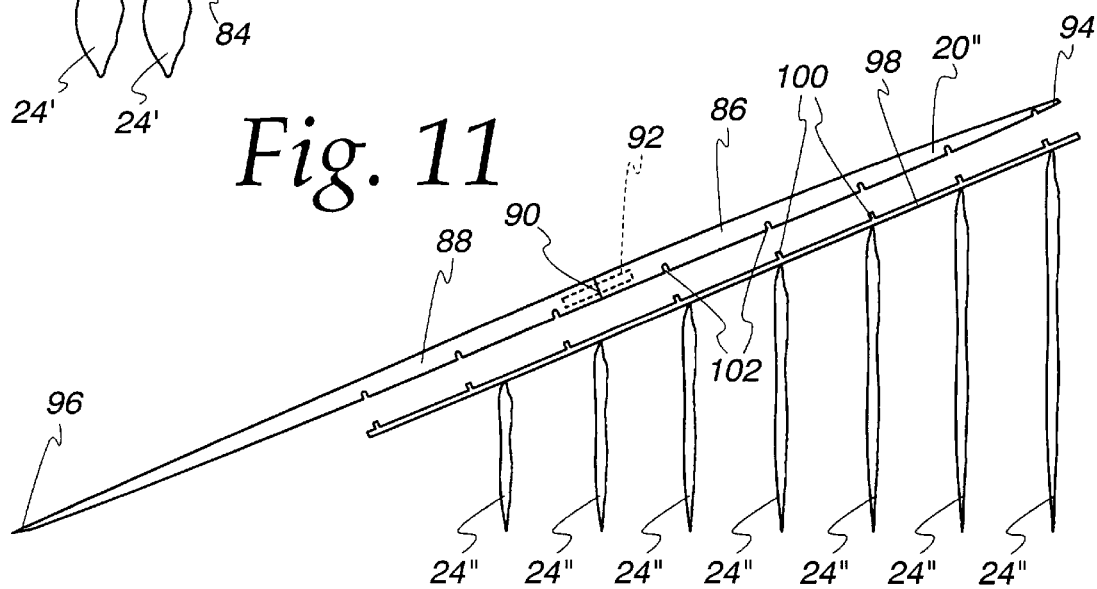

INSECT REPELLING DEVICE

BACKGROUND OF THE INVENTION

1. Field of the Invention

This invention relates to a device for repelling insects and other pests from a specific area, as around food and people.

2. Background Art

Virtually everyone that engages in outdoor activities contends with flying insects and other pests. This is particularly true when food is served as this offers a further attraction to these pests. A myriad of different products are offered to contend with this problem.

One form of pest control is the use of permanent or semi-permanent netted or screened enclosures around a specific area in which people will congregate. While such structures are reasonably effective in limiting pest access, they have a number of drawbacks.

First of all, these structures may be relatively expensive. The netting or screen also degrades over time and may require ongoing repair and upkeep. Further, these structures usually are placed at a specific location to which people become confined. Most significantly, these structures are generally effective only at limiting access by a large number of pests. Many pests inevitably find their way to within the enclosure and become a significant nuisance, even in small numbers.

Another form of pest control is the use of chemicals, such as with foggers. The chemicals used in these foggers are not discriminating as to their victims and kill not only beneficial insects but represent a threat to larger animate objects such as birds and pets. Further, humans may react allergically to such chemicals. Generally, the ingestion of such chemicals by humans is detrimental. Still further, the fogger chemicals are not inexpensive. Effective pest control also may require repeated applications. Follow up applications may be made with food product present, presenting additional obvious dangers.

Insect repellants are reasonably effective as applied to human body parts. Even those repellants do not deter all types of pests. But more significantly, repellants applied as such have no repellant effect on pests that are attracted to food products, such as flies, bees, beetles, etc. These pests commonly land on food and oft times lay eggs, or spread germs, bacteria, and other potentially disease-producing matter upon the food before it is ingested.

Another proposed solution to the pest problem is described in U.S. Pat. No. 5,003,721, to Underwood. Underwood discloses a device with a single, cantilevered wand on a stem that rotates around a vertical axis. The moving wand is described as creating a "visual disturbance" to pests.

While the applicant herein is not familiar with any commercial device made according to Underwood's teachings, it appears that the Underwood structure has a significant number of limitations and drawbacks. First, it appears that the wand would be a disturbance only to pests in a space in, or immediately adjacent to, its path. When a simple wand rotates at relatively slow speeds, pests might have time to land on and contaminate food before the wand returns in its path and encounters or comes near to them.

Further, while the wand is described to be "flexible," it must be rigid enough to maintain its projecting shape of FIG. 1, without sagging. Inherently, this makes the wand rigid enough that it could snag on objects, such as food or eating utensils, in its path. Objects set on a table, or elsewhere where the device is used, must be strategically located to reside out of the path of the wand. Otherwise the wand will be blocked by an article which it encounters, or alternatively will carry or tip an article in its path. If the wand is rotated over a plate as shown in FIG. 1 of Underwood, an individual must time his/her eating motion.

Most significantly, it appears that the device in Underwood has a very limited volume in which it affects pests. If it were made larger with the described configuration, it could become onerous, obstructive, and potentially a hazard to those within its reach.

SUMMARY OF THE INVENTION

In one form, the invention is directed to a device for repelling insects from the vicinity of a support surface for the repelling device. The repelling device has a base which can be placed against an upwardly facing support surface to thereby maintain the repelling device in an operative position, a first arm connected to the base and in an elevated position above the upwardly facing surface on which the repelling device is maintained in the operative position and rotatable around a vertically extending axis, a first element depending from the first arm and rotatable with the first arm around the vertically extending axis, and a drive which is operable to rotate the first arm around the vertically extending axis to thereby cause the first element to trace an annular path around the vertically extending axis.

The base may have a substantially flat surface which can be placed facially against a flat, upwardly facing support surface upon which the repelling device is maintained in the operative position.

The base may include a hub which is rotatable around the vertically extending axis, with the first arm projecting in cantilever fashion from the hub and rotatable with the hub around the vertically extending axis.

In one form, the first arm has a length with a central axis and the central axis is not orthogonal to the vertically extending axis.

The central axis may project upwardly away from the hub.

The repelling device may include a second arm which projects in cantilever fashion from the hub and rotates with the hub around the vertically extending axis.

In one form, the first arm is elongate and there is a second element depending from the first arm and spaced lengthwise along the first arm from the first element.

The second arm may project from the hub at a location that is diametrically opposite to where the first arm projects from the hub.

In one form, the hub is spaced from the surface of the base a distance which can be varied to thereby vary the height of the hub, and thus the one arm, above the upwardly facing support surface upon which the repelling device is maintained in the operative position.

In one form, the base has a generally cylindrical shape and is adorned to simulate a tree trunk, with the element configured to appear as a leaf upon the one arm.

An odiferous insect repellant may be provided on the base to rotate with the first arm and hub around the vertically extending axis.

In one form, the base has a body defining a storage space with there being a removable cover on the body. The space may accommodate one arm and at least one element which is attachable to one of the arms.

The drive may be adjustable to vary the speed at which the first arm is rotated around the vertically extending axis.

In one form, the first element is spaced no more than three feet above an upwardly facing surface upon which the repelling device is maintained in the operative position.

The first element may be flexible sufficiently to bend as the first element traces the annular path around the vertically extending axis.

The first element may be repositionable relative to the first arm to deflect in the event the first element encounters an object in the annular path as the first element is rotated around the vertically extending axis.

The invention is also directed to the combination of a) a table with an upwardly facing surface upon which food product can be placed, and b) a device for repelling insects in a space around the upwardly facing surface. The repelling device has a base which can be placed against the upwardly facing surface to maintain the repelling device in an operative position, a first arm connected to the base in an elevated position above the upwardly facing surface, and a first element depending from the first arm and rotatable with the first arm around the vertically extending axis. The first element has a bottom edge which one of a) engages the upwardly facing support surface and b) is spaced no more than three feet above the upwardly facing support surface. The repelling device further includes a drive which is operable to rotate the first arm around the vertically extending axis to thereby cause the first element to trace an annular path around the vertically extending axis. The first element is repositionable relative to the first arm to deflect in the event the first element encounters an object in the annular path as the first arm is rotated around the vertically extending axis.

The base may have a hub which is rotatable around the vertically extending axis, with the first arm projecting in cantilever fashion from the hub and rotatable with the hub around the vertically extending axis. The repelling device may further include a second arm projecting in cantilever fashion from the hub and rotatable with the hub around the vertically extending axis, and a second element depending from the second arm and rotatable with the second arm around the vertically extending axis.

In one form, the first and second arms are each elongate with a central axis and the central axes are each non-orthogonal to the vertically extending axis and project upwardly away from the hub.

The combination may further include an odiferous insect repellant on the base that is rotatable with the first and second arms around the vertically extending axis.

In one form, there are a plurality of elements on each of the first and second arms spaced from each other lengthwise on each of the arms.

The first element may be flexible sufficiently to bend as the first element traces the annular path around the vertically extending axis.

The invention is further directed to the combination of the device for repelling insects as described above, an arm having a depending, repositionable element thereon which is releasably attachable to the hub so that the element and arm rotate with the hub around a vertically extending axis, and an odiferous insect repellant that can be attached to the hub to rotate with the hub around the vertically extending axis. One or both of the arm and odiferous insect repellant can be selectively attached to the hub to rotate with the hub around the vertically extending axis.

BRIEF DESCRIPTION OF THE DRAWINGS

FIG. 1 is an elevation view of a device for repelling insects, according to the present invention, in an operative position on an upwardly facing support surface on a table in the vicinity of food products supported upon the table, and including two elongate arms, carrying depending elements, which rotate around a vertically extending axis;

FIG. 2 is a plan view of the insect repelling device of FIG. 1;

FIG. 3 is an enlarged, elevation view of a base on the insect repelling device in FIGS. 1 and 2 and including a body, a telescoped sleeve, and a hub and cover upon the sleeve, with the sleeve elevated to increase the height of the hub, and thus the arms and flexible elements carried by the hub, above the upwardly facing support surface;

FIG. 4 is an exploded perspective view of the insect repelling device of FIGS. 1 through 3, with the arms removed therefrom;

FIG. 8 is an enlarged bottom view of the cover on the base;

FIG. 9 is a perspective view of the sleeve on the base;

FIG. 10 is an elevation view of one modified form of elongate arm carrying depending elements that are rotated in operation;

FIG. 11 is a view as in FIG. 10 of a modified form of arm and depending element;

DETAILED DESCRIPTION OF THE DRAWINGS

Figure 5:
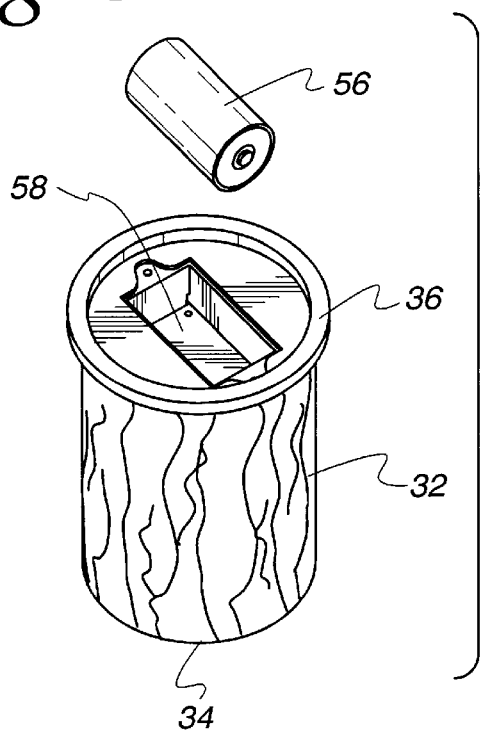
FIG. 5 is a perspective view showing the bottom of the base body which receives a conventional battery for a power supply.
Figure 6:
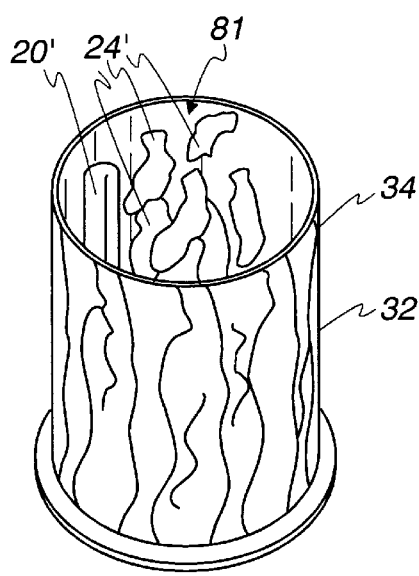
FIG. 6 is a perspective view of the base body with an elongate arm and a flexible element stored therewithin.

Referring initially to FIGS. 1 through 9, one preferred form of device for repelling insects, according to the present invention, is shown at 10. The insect repelling device 10 consists of a base 12, which can be placed against an upwardly facing support surface 14 to maintain the insect repelling device 10 in the operative position of FIG. 1. The base 12 has a hub 16 which is rotatable around a vertically extending axis 18. The insect repelling device 10 further includes first and second elongate arms 20, 22, each attached to the hub 16 to project in cantilever fashion therefrom in an elevated position above the support surface 14. The insect repelling device 10 further includes a plurality of elements 24 which depend from the arms 20, 22, and each trace an annular path around the axis 18 as the hub 16 rotates.

In operation, as the hub 16 is rotated with the arms 20, 22 around the axis 18, the "dangling" elements 24 tend to chase any flies away that are in the paths thereof. Preferably, as described in greater detail below, the elements 24 are flexible and repositionable relative to the arms 20, 22 and drape downwardly to allow the elements 24 to either come in close proximity to, or actually drag over, objects such as containers 26, 28 30 with food product therein, that are in the vicinity of an annular path traced by the elements 24. Aside from repelling insects directly in, and proximate to, the path of the flexible elements 24, a slight airflow pattern is established which makes the area unattractive to insects and other pests.

By using multiple arms 20, 22, the hub 16 can be rotated at a relatively low velocity while causing the elements 24 to approach the insects at relatively short intervals. The rotational velocity may be selected so as not to significantly cool food products or cause shifting of articles in the vicinity of the insect repelling device 10. A single arm could be used, or additional arms to the two arms 20, 22 shown, can be employed. It has been found that the repetitive interference with insects attempting to land in the vicinity of the insect repelling device 10 eventually encourages the insects to leave the vicinity.

The base 12 includes an upwardly opening body 32 with a cylindrical outer surface 34 that may be adorned to simulate a tree, such as a palm tree. The elements 24 can be made in the shape of leaves and may be made of flexible silk material that is commonly used for such purpose to simulate live leaves. The overall appearance of the insect repelling device 10 may thus be similar to a palm tree.

The body 32 of the base 12 has a downwardly facing flat surface 36 which can be placed facially against the upwardly facing surface 14, which in this case is at the top of a table 38. The insect repelling device 10 can be conveniently removably placed at any desired site. The table environment is but one example of a use for the insect repelling device 10.

The structural details of the insect repelling device 10 will now be described. The base 12 consists of the aforementioned body 32 and a cylindrical sleeve 42 which is telescopingly engaged with the body 32 for guided relative movement along the axis 18. The upper region of the sleeve 42 is attached to a dome-shaped cover element 44 which is truncated to define a flat upper surfaced 46 to accommodate the hub 16.

A drive, in the form of a conventional motor 48, resides substantially within a chamber 49, defined by the cover element 44, and is captive between an upper wall 50 on the sleeve 42 and the cover element 44. The motor 48 has an associated drive shaft 52 which projects upwardly through the upper surface 46 to engage the hub 16. The motor may be, for example, a 1.5 volt motor driven by a power supply 54 that in one form is a single D cell battery 56. The battery 56 may be placed in a receptacle 58 on the body 32 that is closed by a removable cover 60. A rheostat 62 may be used for the on/off function for the motor and to control its speed.

The hub 16 has diametrically oppositely located sockets 64, 66, with a split web 68 connecting therebetween. Exemplary socket 64 has an opening 70 designed to loosely receive a base end 72 of the arm 20. The opening 70 is dimensioned to somewhat loosely receive the arm end 72 and to support the arm end so that the lengthwise central axis 74 of the arm 20 is not orthogonal to the axis 18. In the form shown, the angle a that the central axis 74 makes with a horizontal plane P, parallel to the surface 14, is on the order of 20–30°. This causes the elements 24 totraverse a substantial vertical space for each revolution. The arm 22 is similarly mounted and angled at a diametrically opposite location to that of the arm 20.

As noted above, the elements 24 can take a number of diverse shapes. The elements 24 can be rigid and fixedly attached to the arms 20, 24, or repositionable relative to the arms 20, 24 to deflect upon encountering an object in their paths. In a flexible design, the elements 24 could be constructed as simple strings, in the leaf configuration shown, or in virtually any other shape. As another non-limiting example, the elements 24 could be made from paper or feathers. The flexibility may be sufficient to cause the elements to flex as they are rotated and is at least sufficient to cause bending as the elements 24 encounter an object in their path without an excessive force application thereon. In a preferred form, the elements 24 will flow freely over objects encountered. While the elements 24 could be fixedly connected to the arms 20, 22, they are more preferably connected as by a hinge or for universal movement relative to the arms 20, 22.

In one variation to a one piece arm 20,22, and as shown in FIG. 10, an arm 20' has elements 24' depending therefrom. The arm 20' has arm sections 76,78 joined as by a hinge 80. The arm sections 76, 78 are foldable about the hinge 80 between the solid line, extended position, and the folded, phantom position. In the folded position, the arm 20' might be compacted sufficiently to be stored in a space 81 (FIG. 6) bounded by the body 32 of the base 12.

Each arm section 76, 78 has sockets 82 at spaced intervals therealong. The elements 24' have hooks 84, which are extendable into the sockets 82 for releasable mounting thereof. This arrangement permits free, universal movement of the elements 24'. The elements 24, 24' could be suspended from strings or beaded chain or mounted to pivot above an axis such as through a hinge. The elements 24' can likewise be placed in the space 80 (FIG. 6) for facilitated storage and/or transportation of the insect repelling device 10.

In FIG. 11, a modified form of arm 20" is shown with joinable arm sections 86, 88 united at a joint 90, which may be a conventional male-female telescoping connection. An internal bungee cord 92 extends between the lengthwise ends 94, 96 and normally draws the arm sections 86, 88 together. By drawing the ends 86, 88 apart, the cord extends 92 to allow the arm sections 86, 88 to be folded relative to each other to a more compacted state, corresponding to the folded state for the arm 20' in FIG. 10.

In this embodiment, the elements 24" are mounted in groups upon a stem 98 with a series of male projections 100 that can be releasably pressed into a corresponding number of receptacles 102 to maintain the elements 24" upon the arm 20".

The base 12 and arms 20,22 can be readily assembled and disassembled through simple press-fit and withdrawal steps. Once assembled, the insect repelling device 10 can be conveniently placed at any desired location. The length of the arms 20, 22, the angle α, and the distance D (FIG. 1) between the bottom of the lowermost element 24 and supporting surface 14 can be varied as desired. As but one example, the overall length L of the arms 20, 22 may be on the order of 16 inches. The length L1 on the arms 20, 22 on which elements 24 are mounted, may range from dimension equal to the full exposed length of the arms 20,22, to a dimension significantly less than that. The dimension D may be varied by sliding the sleeve 42 between the position shown in FIG. 1 and that shown in FIG. 3. The distance D preferably is no greater than three feet and more preferably is chosen so that the bottoms of the elements 24 come into close proximity with surfaces or objects from which pests are to be discouraged.

Figure 7:
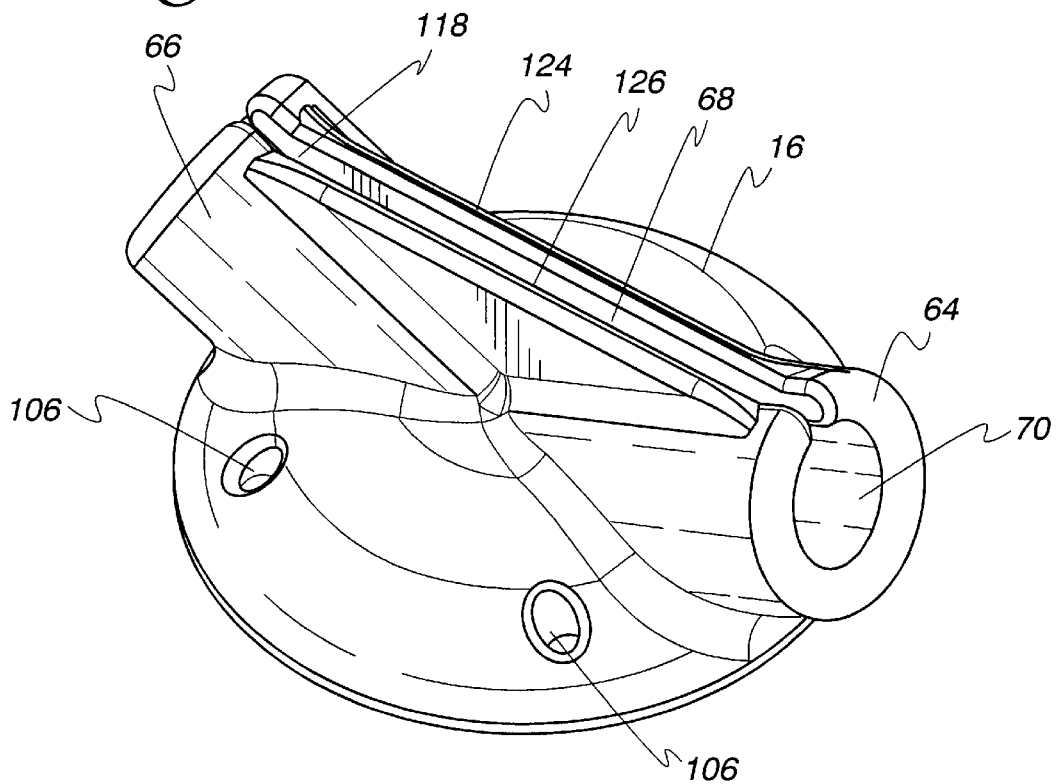
FIG. 7 is an enlarged, perspective view of the hub on the insect repelling device of FIGS. 1 through 6.
Figure 12:
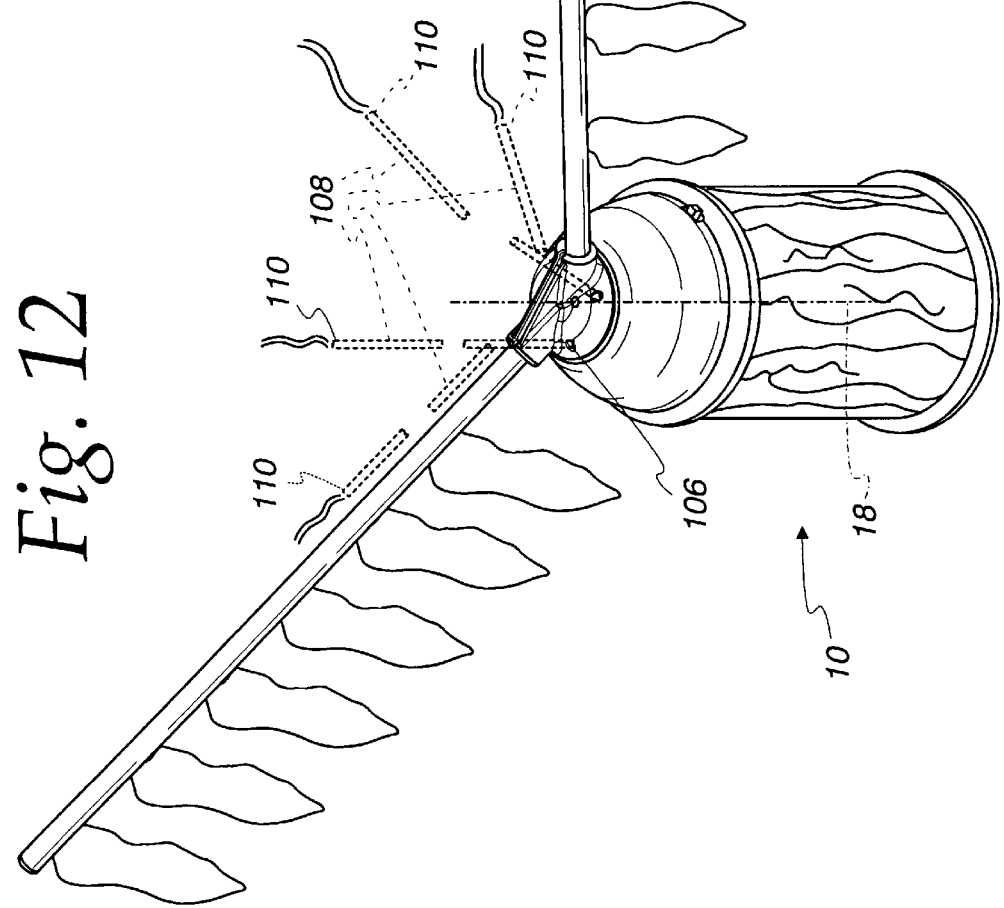
FIG. 12 is a perspective view of the insect repelling device in FIGS. 1 through 9, with one form of odiferous insect repellant attached to the hub.

Referring to FIGS. 7 and 12, the hub 16 is shown to have a plurality, and in this case four, receptacles 106 into which odiferous insect repellant 108, in the form of a wand, can be placed. In this case, the axes of the receptacles 106 are angled with respect to each other and with respect to the vertical axis 18. This type of insect repellant is ignited at its ends 110 to produce the repellant odor. By mounting the insect repellant wands in the manner shown, rotation of the hub 16 produces an air flow over the ends 110 that promotes burning. At the same time, the moving repellant wands 108 cause a distribution of the repellant smoke over a substantial area.

Figure 13:
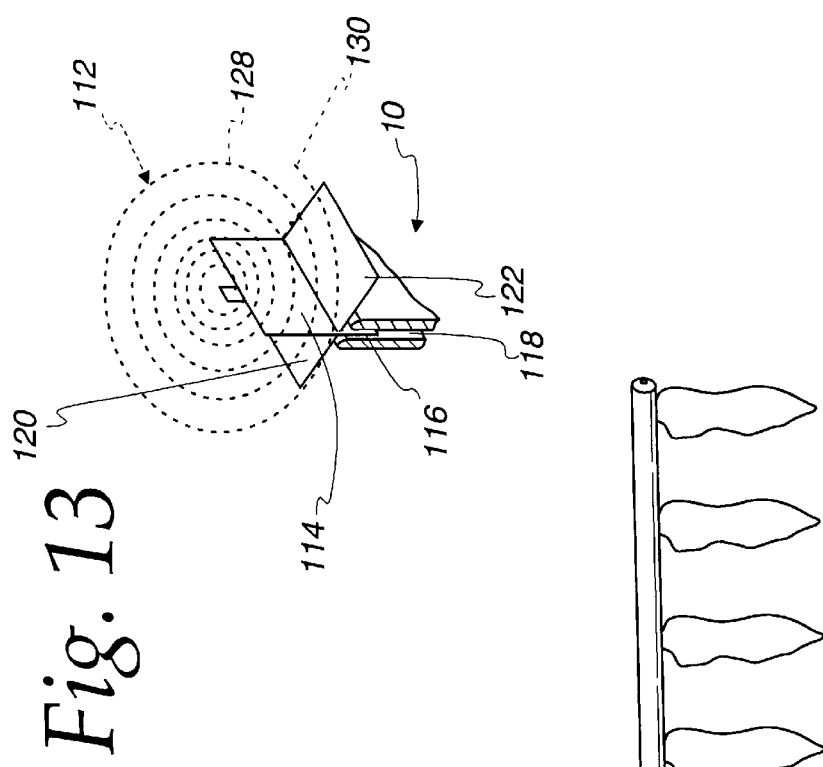
FIG. 13 is an enlarged, fragmentary, perspective view of the hub on the insect-repelling device in FIGS. 1 through 9 and 12, and with another form of odiferous insect repellant attached thereto.

As seen in FIGS. 1, 7 and 13, the split web 68 potentially serves as a base to support a coil-type insect repellant 112. The coil-type insect repellant 112 conventionally comes with a foil, or thin metal, mounting bracket 114. The bracket 114 can be reconfigured to form a leg 116 that is extendable into a slot 118, in which position transverse legs 120, 122 bear on the upper edges 124, 126 of the hub 16 on opposite sides of the slot 118, to thereby provide a support for the coil 128. The coil 128 has an end 130 which is ignited in the same manner as the wand-type repellant 108. The rotary motion of the hub 16 promotes burning and distribution of the repellant-laden smoke produced by burning.

The base 12 could be used for other purposes. For example, as shown in FIG. 4, a sign 132 can be placed in the slot 118 to be displayed thereon as the hub 12 rotates. The sign 132 can carry any type of information 134, that may be advertising or identification material.

The foregoing disclosure of specific embodiments is intended to be illustrative of the broad concepts comprehended by the invention.

What is claimed is:

1. A device for repelling insects from the vicinity of a support surface for the repelling device, said repelling device comprising:
    a base which can be placed against an upwardly facing support surface to thereby maintain the repelling device in an operative position;
    a first arm connected to the base in an elevated position above an upwardly facing surface upon which the repelling device is maintained in the operative position, the first arm being rotatable around a vertically extending axis with the repelling device in the operative position;
    a first element depending from the first arm and rotatable with the first arm around the vertically extending axis; and
    a drive which is operable to rotate the first arm around the vertically extending axis to thereby cause the first element to trace an annular path around the vertically extending axis,
    the first axis element being repositionable relative to the first arm, as to deflect in the event the first element encounters an object in the annular path as the first arm is rotated around the vertically extending axis.

2. The device for repelling insects according to claim 1 wherein the base comprises a substantially flat surface which can be placed facially against a flat upwardly facing support surface upon which the repelling device is maintained in the operative position.

3. The device for repelling insects according to claim 1 wherein the base comprises a hub which is rotatable around the vertically extending axis and the first arm projects in cantilever fashion from the hub and rotates with the hub around the vertically extending axis.

4. The device for repelling insects according to claim 3 wherein the first arm has a length with a central axis and the central axis is non-orthogonal to the vertically extending axis.

5. The device for repelling insects according to claim 4 wherein the central axis projects upwardly away from the hub.

6. The device for repelling insects according to claim 3 further comprising a second arm which projects in cantilever fashion from the hub and rotates with the hub around the vertically extending axis.

7. The device for repelling insects according to claim 3 wherein the first arm is elongate and there is a second element depending from the first arm and spaced lengthwise along the first arm from the first element.

8. The device for repelling insects according to claim 6 wherein the second arm projects from the hub at a location which is diametrically opposite to where the first arm projects from the hub.

9. The device for repelling insects according to claim 3 wherein the base comprises a surface that can be placed against a support surface upon which the repelling device is maintained in the operative position, and the hub is spaced from the surface of the base a distance which can be varied to thereby vary the height of the hub and thus the first arm above the upwardly facing support surface upon which the repelling device is maintained in the operative position.

10. The device for repelling insects according to claim 1 wherein the base has a generally cylindrical shape and is adorned to simulate a tree trunk and the first element is configured to appear as a leaf on the first arm.

11. The device for repelling insects according to claim 1 further comprising an odiferous insect repellant on the base that is rotatable with the first arm around the vertically extending axis.

12. The device for repelling insects according to claim 1 wherein the base comprises a body with a removable cover, the body defining a space for storing at least a part of at least one of the first arm and first element.

13. The device for repelling insects according to claim 1 wherein the drive is adjustable to vary a speed at which the first arm is rotated around the vertically extending axis.

14. The device for repelling insects according to claim 1 wherein the first element is spaced no more than three feet above an upwardly facing surface upon which the repelling device is maintained in the operative position.

15. The device for repelling insects according to claim 1 wherein the first element is flexible sufficiently to bend as the first element traces the annular path around the vertically extending axis.

16. In combination:
    a) a table with an upwardly facing surface upon which food product can be placed;
    b) a device for repelling insects in a space around the upwardly facing surface, the repelling device comprising:
        a base which can be placed against the upwardly facing surface to maintain the repelling device in an operative position;
        a first arm connected to the base in an elevated position above the upwardly facing surface; and
        a first element depending from the first arm and rotatable with the first arm around a vertically extending axis;
        the first element having a bottom edge which one of a) engages the upwardly facing support surface and b) is spaced no more than three feet above the upwardly facing support surface; and
        a drive which is operable to rotate the first arm around the vertically extending axis to thereby cause the first element to trace an annular path around the vertically extending axis,
        the first element being repositionable relative to the first arm, as to deflect in the event the first element encounters an object in the annular path as the first arm is rotated around the vertically extending axis.

17. The combination according to claim 16 wherein the base comprises a hub which is rotatable around the vertically extending axis, the first arm projects in cantilever fashion from the hub and rotates with the hub around the vertically extending axis, and the repelling device further comprises a second arm projecting in cantilever fashion from the hub and rotatable with the hub around the vertically extending axis, and a second element depending from the second arm and rotatable with the second arm around the vertically extending axis.

18. The device for repelling insects according to claim 17 wherein the first and second arms are each elongate with a central axis and the central axes are each non-orthogonal to the vertically extending axis and project upwardly from the hub.

19. The device for repelling insects according to claim 18 further comprising an odiferous insect repellant on the base that is rotatable with the first and second arms around the vertically extending axis.

20. The device for repelling insects according to claim 18 wherein there are a plurality of elements on each of the first and second arms spaced from each other lengthwise on each of the arms.

21. The device for repelling insects according to claim 16 wherein the first element is flexible sufficiently to bend as the first element traces the annular path around the vertically extending axis.

22. In combination:
 a) a device for repelling insects from the vicinity of a support surface for the repelling device, said repelling device comprising:
  a base which can be placed against an upwardly facing support surface to thereby maintain the repelling device in an operative position,
  the base comprising a hub which is rotatable around a vertically extending axis with the repelling device in the operative position; and
  a drive which is operable to rotate the hub around the vertically extending axis;
 b) an arm having a depending, repositionable element thereon which is releasably attachable to the hub so that the repositionable element rotates with the hub around the vertically extending axis,
  the repositionable element repositioning relative to the arm, as to deflect in the event the repositionable element encounters an object as the repositionable element rotates, with the hub around the vertically extending axis; and
 c) an odiferous insect repellant that can be attached to the hub to rotate with the hub around the vertically extending axis,
 whereby i) one or both of the arms and ii) the odiferous insect repellant can be selectively attached to the hub to rotate with the hub around the vertically extending axis.

* * * * *